United States Patent [19]

Vlaanderen

[11] Patent Number: 5,082,417
[45] Date of Patent: Jan. 21, 1992

[54] ACCESSORY FOR A VEHICLE HAVING A HYDRAULIC LOADER

[75] Inventor: James Vlaanderen, Garner, Iowa
[73] Assignee: Stellar Industries, Inc., Garner, Iowa
[21] Appl. No.: 549,901
[22] Filed: Jul. 9, 1990
[51] Int. Cl.⁵ ............................................. B60P 1/28
[52] U.S. Cl. .................................. 414/498; 414/534; 414/531; 414/501
[58] Field of Search .............. 414/498, 499, 500, 495, 414/546, 532, 533, 534, 535, 547, 553, 554

[56] References Cited

U.S. PATENT DOCUMENTS

| 141,098 | 7/1893 | Abeel | 414/531 X |
| 2,470,360 | 5/1949 | Messick | 414/534 |
| 2,567,335 | 9/1951 | Hebert | 414/534 |
| 2,895,629 | 7/1959 | Truxall, Sr. | 414/534 |
| 3,173,558 | 3/1965 | Futch | 414/534 |
| 3,175,710 | 3/1965 | Kistner | 414/534 |
| 3,206,053 | 9/1965 | Bridge | 414/499 |
| 3,892,323 | 7/1975 | Corompt | 414/498 X |
| 4,652,201 | 3/1987 | Boughton | 414/498 X |

FOREIGN PATENT DOCUMENTS

| WO89/04265 | 5/1989 | PCT Int'l Appl. | 414/498 |
| 734035 | 5/1980 | U.S.S.R. | 414/498 |

Primary Examiner—Frank E. Werner
Attorney, Agent, or Firm—Wood, Phillips, Mason, Recktenwald & Vansanten

[57] ABSTRACT

The difficulty in loading a load carrying body (26) onto or removing it from an elevated surface (48) with a standard hydraulic loader arm (30) is avoided through the use of a lifting frame (70) adapted to be mounted to the bed (20) or frame (10) of a vehicle. Pivots (80) mount the frame (70) to the vehicle adjacent one end of the bed (20) and a pair of spaced rollers (42) are journaled on the frame (70). Cylinders (100) selectively move the frame (70) about the pivots (80) between upper and lower positions respectively above and below the vehicle bed (20) enabling a load carrying body (26) to be loaded onto or unloaded from an elevated surface (48).

9 Claims, 2 Drawing Sheets

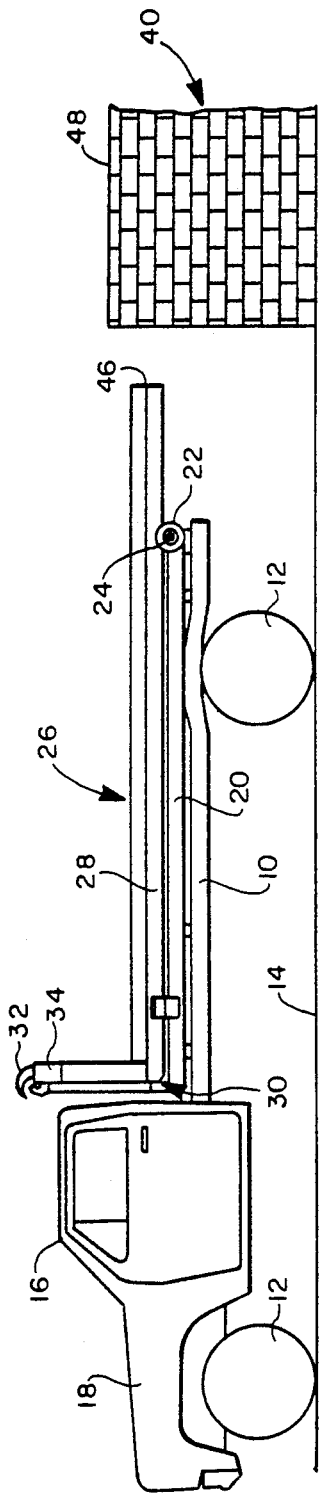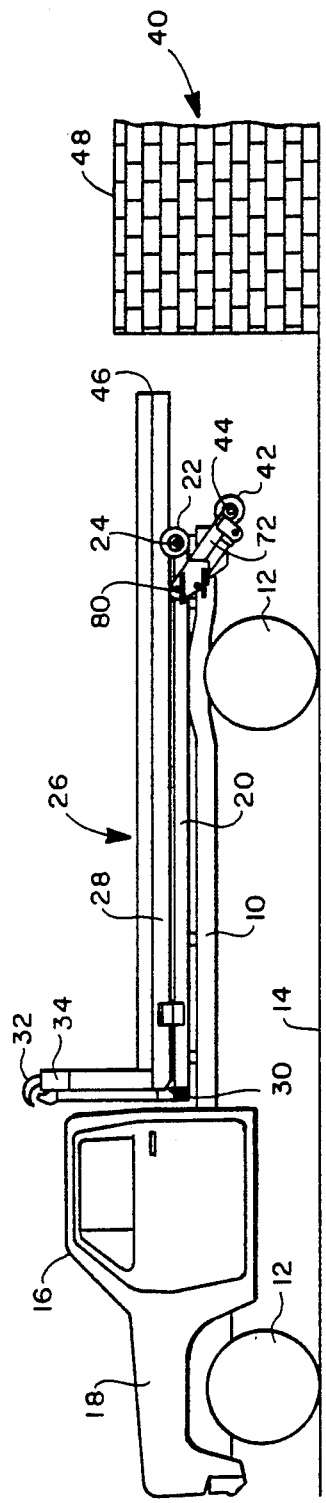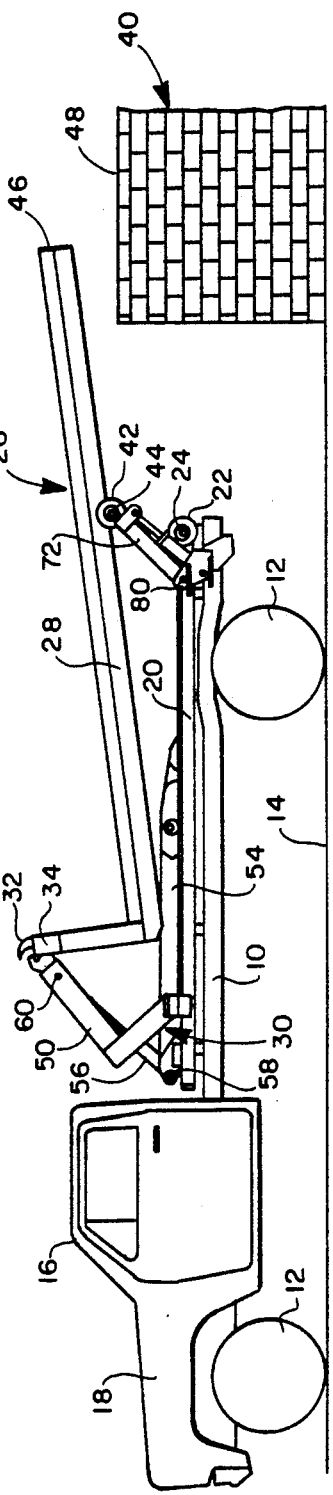

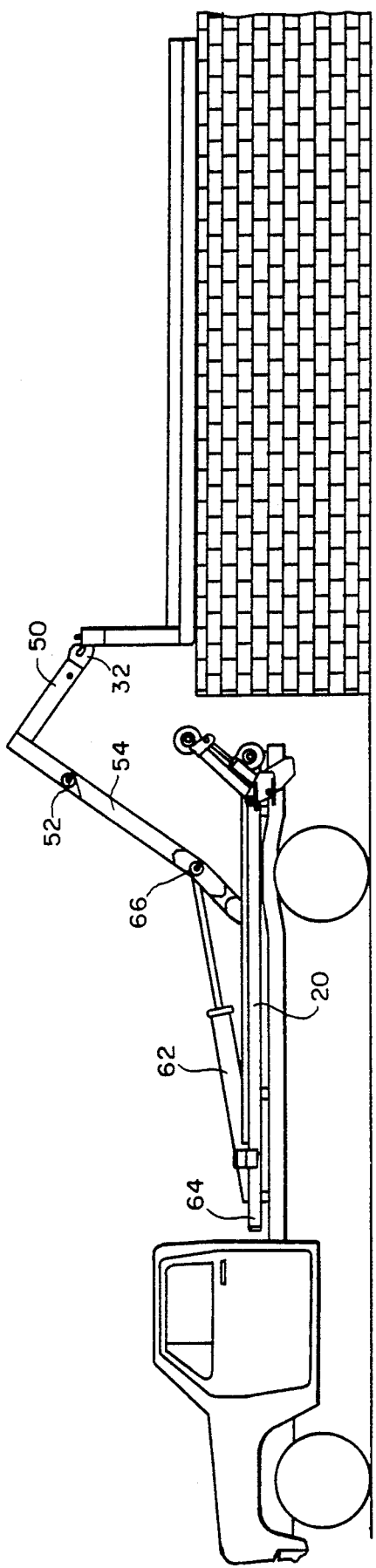
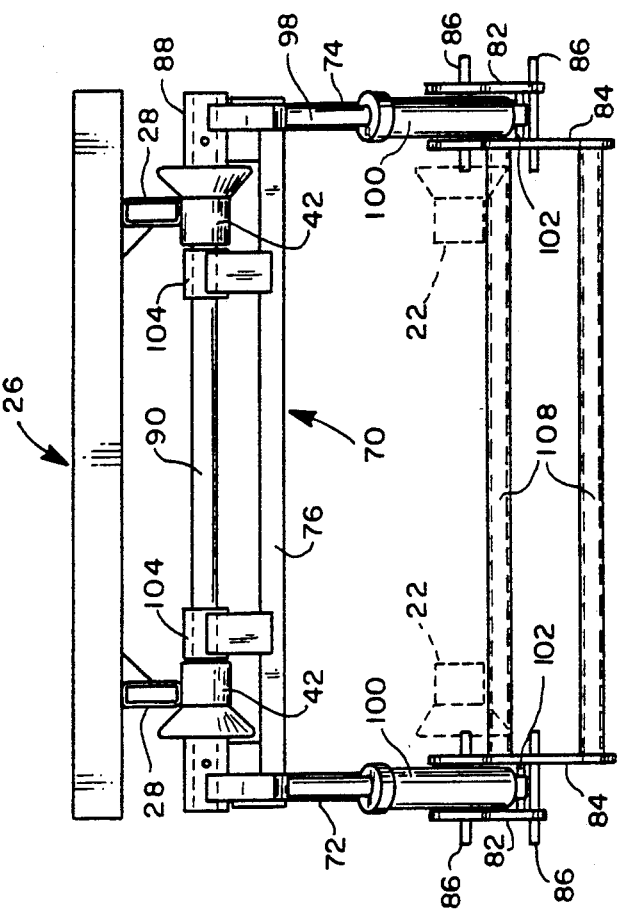
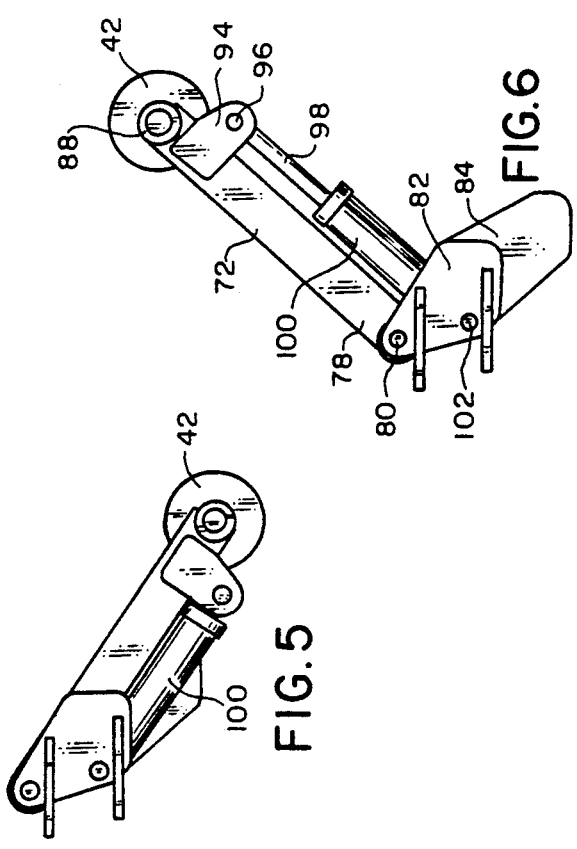

ACCESSORY FOR A VEHICLE HAVING A HYDRAULIC LOADER

FIELD OF THE INVENTION

This invention relates to an accessory for a vehicle having a standard hydraulic loader to enable the same to load or unload a load carrying body from an elevated location as well as to a vehicle including the same.

BACKGROUND OF THE INVENTION

Vehicles having so-called standard hydraulic loader have been extremely successful in the few decades since their introduction. Typically, a load carrying body such as a hopper or a flat bed is temporarily carried on the bed of a vehicle by which the load carrying body is moved from one site to another. Perhaps one of the more common uses is of a hopper or a refuse bin which may be delivered to a site for refuse collection, unloaded at the site and permitted to remain until full, and thereafter picked up and loaded and carried to a refuse disposal operation.

One difficulty presented in the use of such vehicles is where the point at which the load carrying body is to be unloaded is higher than the bed of the vehicle by which the load carrying body is transported. In such a case, it is impossible to unload the load carrying body and this can provide a real limitation on usage where, for example, the load carrying body is to be loaded upon or unloaded from, for example, an elevated loading dock.

To overcome this problem, where the vehicle is provided with outriggers, it has been the procedure to move the vehicle into position adjacent a loading dock or the like and lower the outriggers into engagement with the underlying terrain. The outriggers are then further extended to elevate the bed the vehicle to a location at or above the level of the loading dock to load or unload the load carrying body therefrom.

While this approach is operative for its intended purpose, it is unnecessarily complex to perform and further, necessitates that the vehicle be provided with outriggers, something that is frequently unnecessary.

The present invention is directed to overcoming one or more of the above problems.

SUMMARY OF THE INVENTION

It is the principal object of the invention to provide a new and improved means for a vehicle whereby a load carrying body can be loaded upon or unloaded from a location above the bed of the vehicle that is to transport the load carrying body. It is also the object of the invention to provide an accessory for conventional hydraulic loading vehicles to achieve the same results.

According to one facet of the invention, there is provided a vehicle which includes a vehicle frame having a bed. Ground engaging means are associated with the frame for providing for travel over the underlying terrain and a pair of spaced rollers are journaled to the frame for rotation about a fixed axis adjacent one end of the bed. A swingable, powered load engaging element is mounted on the frame for movement between a lower travelling position adjacent the end of the bed remote from the rollers and elevated loading or unloading positions. An additional pair of spaced rollers are journaled for rotation about a movable axis generally parallel to the fixed axis and located adjacent the bed one end. Means are provided for selectively shifting the additional rollers and the movable axis about which they are journaled above or below the bed one end. As a consequence, when a load carrying body is to be unloaded from the vehicle to or from a location above the vehicle bed, the load carrying body may be elevated by engaging the additional pair of rollers therewith and shifting the additional rollers to an elevated position above the bed.

According to the invention, there is included a pair of spaced arms and a shaft carried by the arms and defining the movable axis. The additional rollers are journaled on the shaft. Means are located oppositely of the shaft for pivoting the arms to the frame of the vehicle.

In a preferred embodiment, the pivoting means is close to the one end of the bed whereat the rollers are journaled about a fixed axis.

In a highly preferred embodiment, a pair of hydraulic cylinders are provided, one for each arm. The cylinders have opposite ends respectively pivoted to the associated arm and to the frame at a location spaced from the means by which the arms are pivoted to the frame.

The invention contemplates that all of the rollers be flanged rollers.

According to another facet of the invention, an accessory is provided for use with a vehicle having a bed with rollers at one end thereof and a load lifting arm for loading and unloading the bed by pivoting and rolling a load on the rollers. The accessory includes a frame, and means for movably mounting the frame to the vehicle adjacent one end of the bed. A pair of spaced rollers are journaled on the frame and means are provided for selectively moving a frame on the mounting means between upper and lower positions adapted to respectively be above and below the vehicle bed.

In one embodiment, the frame is U-shaped and the selective moving means comprises at least one cylinder.

Preferably, the rollers are mounted between the legs of the U-shaped frame near the base thereof and the legs include pivots for mounting to the vehicle.

In one embodiment, the ends of the legs are pivoted to the vehicle frame for pivotal movement about a third pivot axis which is parallel to the fixed pivot axis. Preferably, the third pivot axis is between the fixed pivot axis and the opposite end of the bed.

Other objects and advantages will become apparent from the following specification taken in connection with the accompanying drawings.

DESCRIPTION OF THE DRAWINGS

FIG. 1 is a somewhat schematic, side elevation of a vehicle embodying a prior art hydraulic lifting mechanism;

FIG. 2 is a view similar to FIG. 1, but of a vehicle embodying a mechanism made according to the prior art and with the components in a travelling position;

FIG. 3 is a view similar to FIG. 2, but illustrating certain of the components partially extended as when loading or unloading a load carrying body on an elevated surface;

FIG. 4 is a view similar to FIG. 3, but illustrating the components with the load carrying body deposited on the elevating surface;

FIG. 5 is an enlarged, fragmentary view of part of the invention in the configuration illustrated in FIG. 2;

FIG. 6 is a view similar to FIG. 5, but illustrating the configuration of the same components in a position corresponding to that illustrated in FIGS. 3 or 4; and FIG. 7 is a rear elevational view of certain of the components of the invention showing them in the configuration that corresponds to the position illustrated in FIGS. 3 and 4.

DESCRIPTION OF THE PRIOR ART

FIG. 1 illustrates a conventional or standard hydraulic loader associated with a vehicle. The vehicle includes a vehicle frame 10 mounted on ground engaging wheels 12 which enable the vehicle to traverse the underlying terrain 14. A driver's cab 16 is provided and forwardly thereof is an engine compartment 18 including an engine (not shown) which, amongst other things, is operable to propel the vehicle and to drive a hydraulic pump.

Behind the cab 16, and above the frame 10, is a bed 20 and at the rear end of the bed, flanged rollers 22 are journaled for rotation about a fixed axis 24 by any suitable means. A load carrying body, generally designated 26, overlies the bed 20 and typically will be latched thereto by conventional means (not shown) when the vehicle is moving for obvious reasons. The load carrying body 26 includes spaced, elongated supporting rails 28 which engage the rollers 22.

A load engaging element or arm, generally designated 30, has a hook-like end 32 by which a forward end 34 of the load carrying body 26 may be engaged for loading and unloading purposes. By a linkage that is known in the art and which will be described in greater detail hereinafter, the forward end 34 of the load carrying body 26 may be elevated so that the load carrying body 28 is no longer resting or latched to the bed 20, but rather, is pivoted on the rollers 22 so that it may be lifted onto the bed toward the position illustrated in FIG. 1 or permitted to lower off of the bed in a manner well-known while rolling on the rollers 22.

DESCRIPTION OF THE PREFERRED EMBODIMENT

An elevating mechanism made according to the invention whereby the load carrying body 26 may be unloaded from the vehicle onto an elevated location such as a loading dock shown generally at 40 is illustrated in FIG. 2. In the interest of brevity, conventional components heretofore described in connection with the description of FIG. 1 will not be redescribed, it being understood like components will bear like reference numerals. As seen in FIG. 2, there is provided an additional pair of rollers 42 (only one of which is shown). The rollers are journaled about a movable pivot axis 44 which is parallel to the pivot axis 24 and which may be moved from the position illustrated in FIG. 2 to elevate the rollers 42 from the location shown in FIG. 2 below the rollers 22 to the position illustrated in FIG. 3 above the rollers 22.

In the former position, the loader may be operated in the conventional manner. In the latter position, the additional rollers 42 engage the rails 28 on the underside of the load carrying body 26 to lift the same such that the rear end 46 of the load carrying body 26 is well above the upper surface 48 of the loading dock 40.

FIG. 3 also illustrates, in greater detail, the nature of the load engaging arm 30. In particular, there is provided an L-shaped arm 50 mounting the hook 32 and pivoted oppositely thereof at 52 to an elongated arm 54. The elongated arm 54 is in turn pivoted by a pivot (not shown) located to the side of the midpoint of the bed 20 near the rear end thereof, that is, the end mounting the rollers 22. A hydraulic cylinder 56 extends between a pivot 58 on one end of the arm 54 to a pivot 60 on the L-shaped arm 50. By extending the cylinder 56 from the position illustrated in FIG. 2 to that illustrated in FIG. 3, and assuming the load carrying body 26 is unlatched from the bed 20. The forward end 34 of the load carrying body 26 may be elevated somewhat above the bed 20. Once the desired elevation is achieved, a further cylinder 62 pivoted by means (not shown) to the forward end 64 of the bed 20 and to the arm 54 at a pivot 66 may be extended to swing the arm 54 in a clockwise direction from the position illustrated in FIG. 3 to that illustrated in FIG. 4 to further raise the load carrying body 26. During this operation, the cylinder 56 may be retracted so as to maximize the height of the path of movement of the hook 32.

When this operation is performed with the rails 28 in contact with the rollers 22, the load carrying body 26 may be deposited on the underlying terrain 14 as is well known or on any other object so long as the upper surface is slightly below the level of the bed 20. When depositing the load carrying body 26 on such a surface, the rollers 42 are placed in the position illustrated in FIG. 2.

However, when it is desired to deposit the load carrying body 26 on an elevated surface such as the surface 48 of the loading dock 40, the rollers 42 are elevated to the position illustrated in FIG. 3 during the sequence, preferably at the beginning thereof.

FIGS. 5-7, inclusive, illustrate, with greater precision, the means by which the rollers 44 may be moved between the positions illustrated in FIGS. 2 and 3.

A lifting frame, generally designated 70 is U-shaped in nature and includes spaced arms or legs 72 and 74 and an interconnecting base or bight 76. The arms 72 and 74 have ends 78 which are pivoted by pivot pins 80 extending between mounting plates 82 and 84. The mounting plates 82 and 84 may be secured to frame members 86 which are affixed to the bed 20 and/or the frame 10.

At their ends opposite the pivot pins 80, the arms 72 and 74 mount bushings 88, which in turn mount a cross-shaft 90. The cross-shaft 90 journals the flanged rollers 42 and defines their axis of rotation. Such an axis of rotation is in turn movable with the loading frame 70 by reason of the attachment of the cross-shaft 90 thereto and is parallel to the axis of rotation of the rollers 22.

Adjacent the bushings 88, the arms 72 and 74 mount ears 94 which in turn receive pivot pins 96 connected to the rods 98 of hydraulic cylinders 100. The cylinder ends of the cylinders 100 are pivoted by pivot pins 102 extending between the plates 82 and 84 and in spaced relation to and below the pivot pins 80.

As a consequence, it will be appreciated that when the cylinders 100 are extended, the rollers 42 will be moved to the elevated position illustrated in FIGS. 3, 4, 6 and 7, while when the cylinders 100 are retracted, the rollers 42 are moved to the lowered position illustrated in FIGS. 2 and 5.

It is to be noted that the rollers 42 are located between the arms 72 and 74 and retained in place by inner-bushings 104. It will also be observed that the spacing between the rollers 42 is identical to that between the rollers 22 as can be seen in FIG. 7 and that the same are aligned with one another so as to be aligned with the rails 22 of the load receiving body 26. Strengthening frame elements 108 may extend between the plates 84.

As can be clearly seen in FIGS. 2 and 3, the pivots 80 for the arms 72 and 74 are located between the pivot axis 24 and the load engaging arm 30. The pivots 80 also define a pivot axis that is parallel to the fixed pivot axis 24. The arms 72 are of equal length and as a consequence, the movable pivot axis defined by the shaft 90 for the rollers 42 and 44 will always be parallel to the pivot axis 24 for the rollers 22 as well.

As a consequence of this construction, a highly compact structure results. Because the pivots 80 are located between the pivot axis 24 and the load engaging element 30, the accessory of the invention does not add appreciably to the overall length of the vehicle. By simply making the arms 72 and 74 somewhat greater in length than the distance between the pivots 80 and 24, and because of the location of the rollers 42 inwardly of the arms 72 and 74, the lifting frame 70 will pass readily about the rollers 22 on the rear end of the bed 20 without interfering therewith. This feature allows the accessory to be easily installed on an existing vehicle to add to its capability simply by appropriately securing, for example, the plates 84 to the frame 10 and/or the bed 20.

At the same time, the capability of lifting the rear end of the load carrying member 26, a substantial distance to allow it to be deposited on a surface well above the bed 20 is accomplished.

I claim:

1. A vehicle comprising:
 a vehicle frame including a bed;
 ground engaging means associated with said frame for providing for travel over underlying terrain;
 a pair of spaced first rollers journaled to said frame for rotation about a fixed axis adjacent one end of the bed;
 a swingable, powered, load engaging element mounted on said frame for movement between a lowered traveling position adjacent an end of the bed remote said one end and elevated loading or unloading positions located adjacent said bed one end;
 a pair of spaced second rollers journaled for rotation about a movable axis generally parallel to said fixed axis; and
 means for selectively shifting said second rollers and said movable axis above or below said bed one end whereby said bed may be conventionally loaded or unloaded using only said first rollers; and
 whereby said bed may be loaded from or unloaded to a position above said bed by shifting said second rollers above said bed one end.

2. The vehicle of claim 1 including a pair of spaced arms, a shaft carried by said arms and defining said movable axis, said second rollers being journaled on said shaft, and means oppositely of said shaft pivoting said arms to said frame.

3. The vehicle of claim 2 wherein said pivoting means is close to said bed one end.

4. The vehicle of claim 2 further including a pair of hydraulic cylinder, one for each arm, and having opposite ends respectively pivoted to the associated arm and to the frame at a location spaced from said pivoting means.

5. The vehicle of claim 1 wherein all of said rollers are flanged rollers.

6. A vehicle comprising:
 a vehicle frame including a bed;
 ground engaging means associated with said frame for providing for travel over underlying terrain;
 a pair of spaced first rollers journaled to said frame for rotation about a fixed axis adjacent one end of the bed;
 a swingable, powered, load engaging element mounted on said frame for movement between a lowered traveling position adjacent an end of the bed remote said one end and elevated loading or unloading positions located adjacent said bed one end;
 a lifting frame including spaced arms with opposed ends, the distance between said arms being greater than the distance between said first rollers;
 a pair of spaced second rollers journaled on said lifting frame between said arms and spaced a distance corresponding to the distance between said first rollers and aligned therewith, said second rollers being journaled for rotation at one end of a corresponding one of said arms and about a movable pivot axis parallel to said fixed axis; and
 means movably mounting said lifting frame on said vehicle frame such that said second rollers are proximate said first rollers and may be moved between positions above and below said fixed axis whereby said bed may be conventionally loaded or unloaded using only said first rollers; and
 whereby said bed may be loaded from or unloaded to a position above said bed by moving said second rollers to said position above said fixed axis.

7. The vehicle of claim 6 wherein the ends of said arms opposite said one ends are pivoted to said frame for pivotal movement about a third pivot axis between said positions, said third pivot axis being parallel to said fixed pivot axis.

8. The vehicle of claim 7 wherein said third pivot axis is between said fixed pivot axis and said load engaging element.

9. The vehicle of claim 8 wherein the length of said arms is greater than the distance between said fixed and third axes.

* * * * *